B. N. CRIM.
CULINARY VESSEL.
APPLICATION FILED APR. 28, 1915.
1,248,274.
Patented Nov. 27, 1917.
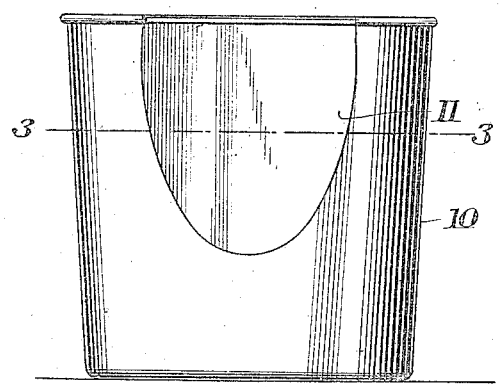
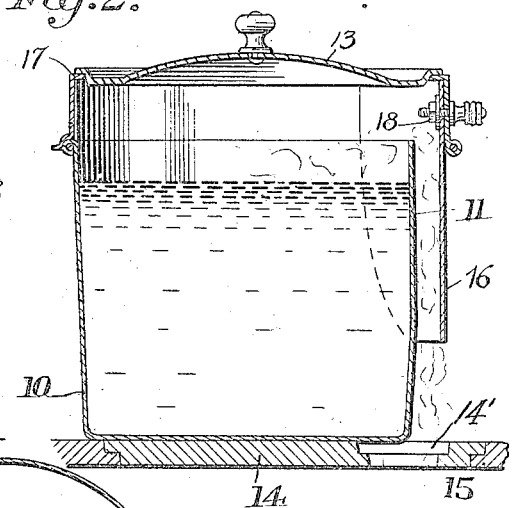
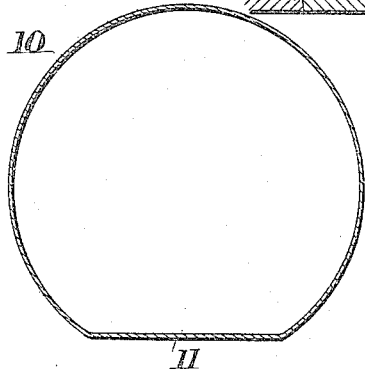
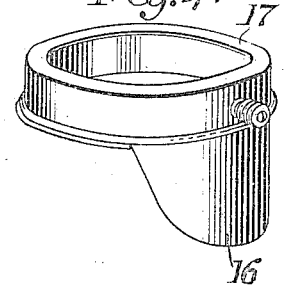
Witnesses
M. H. Slifer.
F. A. Hoster
Inventor
Belle N. Crim
By Victor J. Evans
Attorney

UNITED STATES PATENT OFFICE.

BELLE NORTHRUP CRIM, OF JORDANVILLE, NEW YORK.

CULINARY VESSEL.

1,248,274. Specification of Letters Patent. Patented Nov. 27, 1917.

Application filed April 28, 1915. Serial No. 24,504.

*To all whom it may concern:*

Be it known that I, BELLE NORTHRUP CRIM, a citizen of the United States, residing at Jordanville, in the county of Herkimer and State of New York, have invented new and useful Improvements in Culinary Vessels, of which the following is a specification.

This invention relates to culinary vessels, and particularly to kettles and similar vessels customarily used for cooking vegetables and the like, the object of the invention being to provide a vessel whereby, when the same is in use, the steam and odors discharged from the vessel during the cooking operation will be discharged into the stove, thereby rendering the vessel easier to handle and at the same time doing away with obnoxious cooking odors.

A further object of the invention is to provide a culinary vessel which comprehends a suitable vent for the steam and odors, said vent being so located that the steam or odors arising from the vessel will pass through the vent and be subsequently drawn into the fire box of the stove by the induced currents of air which pass from the room into the fire box of the stove through an entrance provided thereto.

In the further disclosure of the invention reference is to be had to the accompanying drawings, constituting a part of this specification, in which similar characters of reference denote corresponding parts in all the views, and in which:

Figure 1 is a side elevation of the vessel;

Fig. 2 is a vertical sectional view taken through the vessel, showing the same seated upon the stove;

Fig. 3 is a horizontal sectional view taken on the line 3—3 in Fig. 1;

Fig. 4 is a perspective view illustrating the guard removed from the vessel.

Referring more particularly to the views, I provide a receptacle 10 in the nature of the usual cooking vessel and which, at a point on its side, has an inwardly depressed portion 11 providing an opening or vent 12 when a cover 13 is arranged upon the vessel as shown. The vessel 10 is adapted to be placed on top of the usual stove having a stove lid 14, with an opening 15 therein, and which is in alinement with the vent 12, so that the cooking odors arising in the vessel will pass through the vent 12 and be drawn with the induced currents of the air in the room into and through the opening 14' to pass into the fire box 15 of the stove.

It will be seen that when the vessel is to be placed so as to have its lower portion extend into the fire pot 15 of the stove, that the vent 12 is close to the opening in the stove and that with a vessel placed on top of the stove as shown or arranged to extend into the fire pot of the stove as also illustrated, the cooking odors arising in the vessel will pass through the opening in the stove with the induced currents of air in the room, and which will be drawn through the opening in the stove due to the provision of a fire therein. The room will thus be free from obnoxious odors and the contents of the vessel will be prevented from contamination with obnoxious odors that might ordinarily be contained in the air in the room and which in this instance pass into the stove with the induced currents of air.

A supplementary member 16 is provided in the nature of a guard, and which is adapted to have its upper end detachably connected to a rim 17, and interposed between the vessel and the cover, by means of a threaded bolt and nut connection 18. The member 16 is dependingly supported in spaced relation to the side of the vessel so that the cooking odors arising in the vessel can pass downwardly between the guard and the side of the vessel and thence pass into the stove, when the vessel is placed on top of the stove. The guard being preferably of a segmental configuration in cross section, and when the vessel is placed so as to have its lower portion extend into the fire pot 15 of the stove, this member or guard 16, owing to its detachable connection with the rim 17 of the closure is detached therefrom.

From the foregoing description it will be seen that the various forms of the invention illustrated will effectively perform the result for which they are designed and that the usual obnoxious cooking odors which ofttimes arise, especially when vegetables are being cooked, will not be distributed through the room or the house but will pass with the induced currents through the opening in the top of the stove and into the fire pot. Particularly when the odors are mixed with steam and pass into the stove, it will be clear that the steam will greatly aid combustion and thus facilitate the production of heat from the fire in the stove and which is necessary to cook the contents of the vessel.

Having thus described my invention, I claim:

A culinary vessel embodying a receptacle adapted to be reposed upon the top surface of a stove in vertical overhanging relation with respect to an opening in the said top, a cover therefor, and a vent formed by flattening a portion of the exterior side surface of the receptacle, the steam or cooking odors from the receptacle adapted to pass through the vent, an annular member reposing upon the top edge of the receptacle and positioned between the top edge of the receptacle and the bottom of the cover, and a segmental guard detachably connected to the inner circumference of said annular member and depending therefrom, with the body portion thereof in spaced parallel relation with the flattened side portion of the vessel to form a channel for directing the steam and cooking odors passing through the vent into the opening in the top of the stove.

In testimony whereof I affix my signature in presence of two witnesses.

BELLE NORTHRUP CRIM.

Witnesses:
JOHN H. WAINMAN,
GEORGE W. BELSHAW.

Copies of this patent may be obtained for five cents each, by addressing the "Commissioner of Patents, Washington, D. C."